(12) United States Patent (10) Patent No.: US 12,691,618 B2

Moroni (45) Date of Patent: Jul. 28, 2026

(54) MACHINE FOR THE TEMPERATURE CONTROL OF PART OF AN INDUSTRIAL PLANT ADAPTED FOR THE FORMATION OF A PRODUCT

(71) Applicant: FRIGEL FIRENZE S.P.A., Scandicci (IT)

(72) Inventor: Alessandro Moroni, Scandicci (IT)

(73) Assignee: FRIGEL FIRENZE S.P.A., Scandicci (IT)

( * ) Notice: Subject to any disclaimer, the term of this patent is extended or adjusted under 35 U.S.C. 154(b) by 222 days.

(21) Appl. No.: 18/721,265

(22) PCT Filed: Dec. 19, 2022

(86) PCT No.: PCT/IB2022/062452

§ 371 (c)(1),
(2) Date: Jun. 18, 2024

(87) PCT Pub. No.: WO2023/119109

PCT Pub. Date: Jun. 29, 2023

(65) Prior Publication Data

US 2025/0050566 A1 Feb. 13, 2025

(30) Foreign Application Priority Data

Dec. 20, 2021 (IT) ........................ 102021000031835

(51) Int. Cl.
*B29C 45/76* (2006.01)
*B29C 45/73* (2006.01)
*B29C 45/78* (2006.01)

(52) U.S. Cl.
CPC ...... *B29C 45/7331* (2013.01); *B29C 45/7306* (2013.01); *B29C 45/78* (2013.01);
(Continued)

(58) Field of Classification Search
CPC . B29C 45/73; B29C 45/7306; B29C 45/7331; B29C 45/76; B29C 45/78;
(Continued)

(56) References Cited

U.S. PATENT DOCUMENTS 4,072,181 A 2/1978 Kostura et al.
2009/0174101 A1 7/2009 Johnson
(Continued)

*Primary Examiner* — Thu Khanh T. Nguyen
(74) *Attorney, Agent, or Firm* — McGlew and Tuttle, P.C.

(57) ABSTRACT

Machine (10) for the temperature control of part of an industrial plant adapted for the formation of a product, comprising at least one thermoregulating hydraulic circuit (11) adapted to be operationally connected with a part of an industrial plant adapted for the formation of a product, wherein a thermoregulating liquid circulates in said hydraulic circuit (11); said hydraulic circuit comprising—a recirculating pump (12) for the thermoregulating liquid, of the variable flow type, —downstream of the pump (12), a section (13) for delivery of the thermoregulating liquid from the hydraulic circuit (11) to the product formation part (B) of an industrial plant, —a section (14) for returning the thermoregulating liquid from the product formation part (B) of an industrial plant to the hydraulic circuit (11), —a heat exchange unit (15) for the thermoregulating liquid, placed between said return section (14) and said pump (12), wherein the thermoregulating liquid is thermoregulated, said machine (10) further comprising an electronic control and management apparatus (30), in which there is set at least one value for the operating temperature of the thermoregulating liquid and at least one predetermined time-based pump flow rate variation profile, according to which, upon receipt of a synchronization signal at a predetermined moment of the industrial process of product formation in the part (B) of the plant to be thermoregulated, the pump (12) moves the thermoregulating liquid with a variable flow rate based on said predetermined time-based flow variation profile.

17 Claims, 7 Drawing Sheets

(52) U.S. Cl.
CPC ............... *B29C 2945/76545* (2013.01); *B29C 2945/76782* (2013.01); *B29C 2945/76892* (2013.01); *B29C 2945/76939* (2013.01)

(58) Field of Classification Search
CPC ........... B29C 2945/76545; B29C 2945/76551; B29C 2945/76775; B29C 2945/76782; B29C 2945/76929; B29C 2945/76892; B29C 2945/76939

See application file for complete search history.

(56)                        References Cited

U.S. PATENT DOCUMENTS

| | | |
|---|---|---|
| 2013/0233504 A1 | 9/2013 | Penocchio et al. |
| 2017/0153074 A1 | 6/2017 | Balka et al. |

MACHINE FOR THE TEMPERATURE CONTROL OF PART OF AN INDUSTRIAL PLANT ADAPTED FOR THE FORMATION OF A PRODUCT

TECHNICAL FIELD

The present invention relates to the field of thermal conditioning equipment for industrial use, such as, for example, moulding plants (e.g. die-casting plants for plastic materials, metals, ceramics, etc., endothermic and exothermic chemical reactors, glass processing plants, etc.), and more particularly it relates to a machine for the temperature control of an industrial user, such as a forming mould, for example.

PRIOR ART

As is known, in many industrial processes, such as for example moulding processes relating to die-casting plants for plastic materials, metals, ceramics, etc., or plants with endothermic or exothermic reactors, glass processing plants, etc., it is necessary to condition the temperature of certain parts, especially parts of the system where product formation takes place.

By making specific reference, for example, to the case of moulding items using forming moulds, in order to optimise working times and the end quality of the product, it is necessary to condition the temperature of the mould body.

For example, in plastic injection moulding, molten plastic material is injected into a closed mould. The high temperature of the molten substance heats the mould. The process involves a certain amount of waiting time after the injection to cool the item contained in the mould. In order to reduce said waiting time and ensure an adequate temperature profile, the mould is cooled during the moulding.

The traditional method of cooling is for the mould to be crossed by ducts through which cooling water passes, the flow rate and temperature of which are kept constant throughout the entire process and are chosen based on the mould cooling profile one wishes to obtain.

This method of cooling is very simple and is well suited to many types of situations.

On the other hand, however, said operational method of conditioning the temperature of the mould does not enable the best performance results to be obtained in terms of the overall amount of energy used in the cooling process, as well as the overall speed of the process.

SUMMARY

The aim of the present invention is to solve the problems associated with the conditioning of parts of industrial plants, such as moulds for example, during the process of forming products by moulding.

Therefore, an object of the present invention is to provide a machine for the temperature control of part of a plant for an industrial process, such as a forming mould for example, which makes it possible to reduce the amount of energy used in conditioning the temperature of the part of the plant subject to thermal conditioning.

Another important object of the present invention is to provide a machine for the temperature control of part of a plant for an industrial process, such as a forming mould for example, which makes it possible to speed up the product formation process.

Another important object of the present invention is to provide a machine for the temperature control of a forming mould that makes it possible to optimise the temperature profile of part of a product-forming plant, in order to improve the quality of the product.

These and other objects, which will become more evident below, are achieved by a machine for the temperature control of a product formation part in an industrial plant such as, preferably but not exclusively, a forming mould, comprising at least one thermoregulating hydraulic circuit adapted to be operationally connected with a product formation part of an industrial plant, wherein a thermoregulating liquid circulates in said hydraulic circuit; this hydraulic circuit comprises a recirculating pump for the thermoregulating liquid, of the variable flow type, downstream of the pump, a section for delivery of the thermoregulating liquid from the hydraulic circuit to the product formation part of an industrial plant, a section for returning the thermoregulating liquid from the product formation part of an industrial plant to the hydraulic circuit, a heat exchange unit for the thermoregulating liquid, placed between the return section and the pump, wherein the thermoregulating liquid is thermoregulated;

said machine further comprising an electronic control and management apparatus, in which there is set at least one value for the operating temperature of the thermoregulating liquid and at least one predetermined time-based pump flow rate variation profile, according to which, upon receipt of a synchronization signal at a predetermined moment of the industrial process of product formation in the part of the plant to be thermoregulated, the pump moves the thermoregulating liquid with a variable flow based on said predetermined flow variation profile over time Preferably, the machine is adapted for connection to a product forming mould, so that the part of the plant to be thermoregulated is the forming mould. Hereinafter, explicit reference is made to a forming mould and to a moulding process using said mould. The embodiments of the machine described below, even if they relate to moulds, must also be understood as being applicable to cases in which the machine can be connected to delivery and return sections of product-forming parts of industrial plants other than moulding plants, such as for example for products created in chemical reactors or other devices.

Therefore, the synchronization signal at a predetermined moment of the industrial process of product formation in the part of the plant to be thermoregulated, the receipt of which relates to the movement of the liquid to be thermoregulated by the pump with a variable flow rate based on said predetermined time-based flow rate variation profile, can be any signal correlated with a phase (or instant) of the production cycle of the industrial process of product formation. Said phase or instant must be repeated in a constant manner, at the same moment of the production cycle. For example, in the case of a formation process in a forming mould, the production cycle involves moments that are repeated constantly, and each of which can determine the synchronization signal, such as for example the closure of the forming mould, the start of the injection (in the case of injection moulding) of material into the mould, or the introduction of the material into the mould, the end of the injection phase, the start of maintaining pressure in the forming mould, or even the command to open the purge gases that the injection presses send into the mould after the injection, or even the mould opening at the end of the cycle, etc.

Varying the flow rate, i.e. the quantity in the unit over time, of thermoregulating liquid, for example in a forming mould, makes it possible to vary the amount of heat exchanged over time between the mould and the thermoregulating liquid. Therefore, by knowing the temperature of the forming material in the mould over time, in other words the temperature of the mould if it were not conditioned by the thermoregulating liquid, it is possible to program a suitable variation of the quantity of liquid circulating in the mould, thereby obtaining thermoregulation of the mould in the preferred manner, by providing the preferred quantity of liquid at the right moment in order to achieve the desired mould temperature profile over time. It should be noted that the control operation does not envisage retro-control of the mould temperature but simply the delivery of given quantities of thermoregulating liquid at the necessary moments determined earlier, prior to the start of the process, in other words programmed.

In practice, given an industrial process forming cycle, for example moulding, which involves closure of the mould, the forming phase and subsequent opening of the mould, the machine according to the invention enables a flow of thermoregulating liquid to be introduced into the mould, the flow rate of which varies in a predetermined manner over the time of the forming cycle, and where this variation is synchronized with the forming cycle based on a synchronization signal, for example coming from the moulding plant. For example, the predetermined moment of the moulding process at which the aforementioned synchronization takes place may be the moment the mould is closed, which is associated with a signal connected to the closure of the mould, i.e. at the start of the forming phase.

For example, the mould may be associated with a sensor that detects the closure/opening of the mould, operationally connected to the electronic device, so that the electronic device commands the machine to match, or synchronize, the start of the time-based pump flow rate variation profile with the closure of the mould.

Similarly, as already mentioned above, the predetermined moment of the moulding process for which the aforementioned synchronization takes place, can be associated with other moments of the forming cycle, other than the moment of mould closure. For example, in the case of injection moulding, synchronization may occur at the start of the injection phase, or at the start of the typical phase of the moulding process that involves "post-pressure", i.e. the period immediately after injection when the pressure is maintained for a certain length of time, or it may even occur with the command to open the purge gases that the injection presses generally send into the mould after injection, or when the command is given to switch from mould open to mould closed, etc.

The fact of being able to send the right quantity of thermoregulating liquid when it is most appropriate, instead of always using a constant liquid flow rate, enables the operating temperature to be optimized. For example, in the case of cooling a mould by means of a variation in the flow rate of the thermoregulating liquid (in this case, coolant liquid), the operating temperature of the liquid can be much lower than in the case with a constant flow rate. Indeed, it is possible to have a low liquid flow rate with a low (constant) operating temperature when it is necessary to cool to a small extent, and on the other hand to have a high liquid flow rate (with the same low, constant temperature) when it is necessary to exchange a lot of heat, in other words when a lot of cooling is required. In the traditional case of a constant flow rate, the operating temperature cannot be too low because the mould would cool too much, and it is therefore necessary to use a higher average temperature (for a longer period than the innovative variable flow rate system described herein).

Preferably, the pump is of a type with a variable-speed impeller, so that varying the speed of the impeller also varies the flow rate of the pump; therefore, the predetermined time-based pump flow rate variation profile corresponding to a predetermined time-based impeller speed variation profile.

Even more preferably, the pump comprises an inverter adapted to manage the rotation speed of the pump impeller, so that the predetermined time-based pump flow rate variation profile corresponds to a predetermined profile for electrical feed frequency variation of the pump electric motor, by means of the inverter. The use of a pump with an inverter in the specific application considered turns out to be particularly innovative and advantageous, for example when compared with known technology for a pump with an impeller, the speed of which can be varied by means of a servomotor.

The servomotor is an electro-mechanical device that acts directly on the fluid in the pump, while the inverter is simply an electrical power frequency converter that makes it possible to manage the pump in an optimal, simplified manner in relation to the variation of its speed.

The use of a pump with a variable-speed impeller gives great control over the thermoregulating liquid flow rate variation, thereby obtaining better results in terms of heat exchange at the most appropriate moments of the moulding cycle, due to being able to use lower operating temperatures and perform shorter moulding cycles.

In preferred embodiments, the heat exchange unit for the thermoregulating liquid is placed between the return section and the pump, i.e. the pump is downstream of the heat exchange unit; in other embodiments, the pump can be upstream of the heat exchange unit, i.e. the pump is placed between the return section and the heat exchange unit.

According to preferred embodiments, downstream of the heat exchange unit and upstream of the access section of the thermoregulating liquid in the forming mould, there is a heating device for the thermoregulating liquid, which allows the thermoregulating liquid to be heated, if necessary, to the value of the operating temperature in the case where the temperature of the liquid entering said heating device is inferior; preferably the heating device is downstream of the pump.

According to preferred embodiments, the hydraulic circuit comprises a tank for the thermoregulating liquid, interposed between the pump and the heat exchange unit; said tank is a) at ambient pressure, or b) closed and held in a given pressure range that does not include ambient pressure; preferably the tank is operationally connected to a branch for loading thermoregulating liquid coming from a feed network external to the machine.

According to preferred embodiments, the machine comprises, integrated within it, a thermal conditioning apparatus adapted to provide the heat exchange unit with a thermal conditioning fluid adapted to exchange heat with the thermoregulating liquid; preferably the thermal conditioning apparatus together with the heat exchange unit form a refrigeration system integrated within the machine, and comprising for example a compressor, a condenser, an evaporator and a storage tank, each with variable dimensions calculated as a function of the refrigerating power required. In the case where the thermoregulating liquid is a coolant liquid, the heat exchange unit is in practice the evaporator of the refrigeration system; conversely, if the thermoregulating liquid is a heating liquid, the heat exchange unit is a condenser.

In other examples, the machine comprises a thermal conditioning apparatus still formed by a refrigeration system integrated within the machine, comprising for example a compressor, a condenser, an evaporator and an expander, each with variable dimensions calculated as a function of the refrigerating power required, adapted to provide the heat exchange unit with a thermal conditioning fluid adapted to exchange heat with the thermoregulating liquid; in this case, the thermal conditioning apparatus and heat exchange unit are distinct and connected only by pipes for the passage of the thermal conditioning fluid.

In other embodiments, the machine's thermal conditioning unit is operationally connected to a source of thermal conditioning fluid external to the machine, for example the thermal conditioning unit is a heat exchanger interconnected with an external refrigerating/heating source derived from the centralized system of the plant where it is installed, or it is connected to an external refrigeration system.

According to another aspect, the invention relates to a machine for the temperature control of part of an industrial plant adapted for product formation, according to one or more of the following clauses.

Clause 1: Machine for the temperature control of part of an industrial plant adapted for the formation of a product, comprising at least one thermoregulating hydraulic circuit adapted to be operationally connected with a part of an industrial plant adapted for the formation of a product, wherein a thermoregulating liquid circulates in said hydraulic circuit; said hydraulic circuit comprising a recirculating pump for the thermoregulating liquid, of the variable flow type, downstream of the pump, a section for delivery of the thermoregulating liquid from the hydraulic circuit to the product formation part of an industrial plant, a section for returning the thermoregulating liquid from the product formation part of an industrial plant to the hydraulic circuit, a heat exchange unit for the thermoregulating liquid, placed between said return section and said pump, wherein the thermoregulating liquid is thermoregulated, said machine further comprising an electronic control and management apparatus, in which there is set at least one value for the operating temperature of the thermoregulating liquid and at least one predetermined time-based pump flow rate variation profile, according to which, upon receipt of a synchronization signal at a predetermined moment of the industrial process of product formation in the part of the plant to be thermoregulated, the pump moves the thermoregulating liquid with a variable flow based on said predetermined flow variation profile over time.

Clause 2: Machine according to clause 1, wherein said pump is of a type with a variable-speed impeller, so that varying the speed of the impeller also varies the flow rate of the pump; said predetermined time-based pump flow rate variation profile corresponding to a predetermined time-based impeller speed variation profile.

Clause 3: Machine according to clause 1, wherein said pump comprises an inverter adapted to manage the rotation speed of the pump impeller, so that said predetermined time-based pump flow rate variation profile corresponds to a predetermined profile for pump feed frequency variation by means of said inverter.

Clause 4: Machine according to one or more of the previous clauses, wherein downstream of said heat exchange unit and upstream of said section for delivery to the product formation part of an industrial plant, there is a thermoregulating liquid heating device adapted to heat said thermoregulating liquid, if necessary, to said operating temperature in the case where the input temperature to said heating device is lower; said heating device being preferably downstream of said pump.

Clause 5: Machine according to one or more of the previous clauses, wherein said hydraulic circuit comprises a tank for the thermoregulating liquid, interposed between said pump and said heat exchange unit, said tank being at ambient pressure or closed and held in a pressure range that does not include ambient pressure; preferably said tank being operationally connected to a branch for loading thermoregulating liquid coming from a feed network external to the machine.

Clause 6: Machine according to one or more of the previous clauses, comprising a thermal conditioning apparatus adapted to provide said heat exchange unit with a thermal conditioning fluid adapted to exchange heat with said thermoregulating liquid; preferably said thermal conditioning apparatus forms, with said heat exchange unit, a refrigeration system entirely inside the machine, wherein said heat exchange unit forms a condenser or evaporator for the refrigeration system, or is a refrigeration unit distinct from said thermal conditioning unit, adapted to provide said unit with a thermal conditioning liquid for conditioning said thermoregulating liquid by means of heat exchange.

Clause 7: Machine according to one or more of the clauses from 1 to 5, wherein said heat exchange unit has inlet and outlet pipes for feeding a thermal conditioning fluid, operationally connected to a thermal conditioning system external to the machine.

Clause 8: Machine according to one or more of the previous clauses, wherein said section for delivery and said section for returning the thermoregulating liquid are adapted to be operationally connected to a pipe inside a forming mould so as to send the thermoregulating liquid into the forming mould to thermoregulate it and to allow the return of the liquid to be reconditioned.

Clause 9: Machine according to one or more of the previous clauses, adapted to work in cyclical ways, wherein said electronic control and management apparatus can receive a signal from the formation part of the industrial plant to be thermoregulated, synchronize a flow rate variation profile for said pump with said signal, so that from a given moment during the machine operating cycle, the pump flow rate varies in a predefined manner.

Clause 10: Machine according to clause 9, adapted to cool a forming mould, wherein the machine is adapted to receive a closure signal for the mould to be thermoregulated, the thermoregulating liquid is sent by the pump to the mould at a constant operating temperature during the moulding phase, there being envisaged a phase of regulating the temperature of the liquid before sending it to the mould, in the case of a temperature value lower than the operating temperature, in a moulding cycle involving closing-opening-closing of the mould, the flow rate variation profile for the thermoregulating liquid entering the mould is synchronized with the moulding cycle based on the mould closure signal and provides for a low initial flow rate value, for gentle cooling of the mould, and a subsequent high flow rate value, greater than said initial value, for a more intense cooling of the mould.

Clause 11: Machine according to clause 10, wherein, in the case where for a given interval of time the machine does not receive closure signals from the mould, the pump flow rate variation profile is modified to keep the flow rate at a low value for gentle cooling of the mould, the value for the operating temperature of the thermoregulating liquid entering the mould is increased, preferably to a value corresponding to the temperature value of the mould at the moment the mould is closed, subsequent to said interval of time without signals, upon receipt of a new mould closure signal, the flow rate variation profile for the liquid entering the mould returns to the predetermined profile for a normal moulding cycle.

BRIEF DESCRIPTION OF THE DRAWINGS

The invention will be better understood from the following description and accompanying drawings, which illustrate examples of non-limiting forms of the invention. In particular, in the drawings.

DETAILED DESCRIPTION OF EMBODIMENTS

Figure 1:
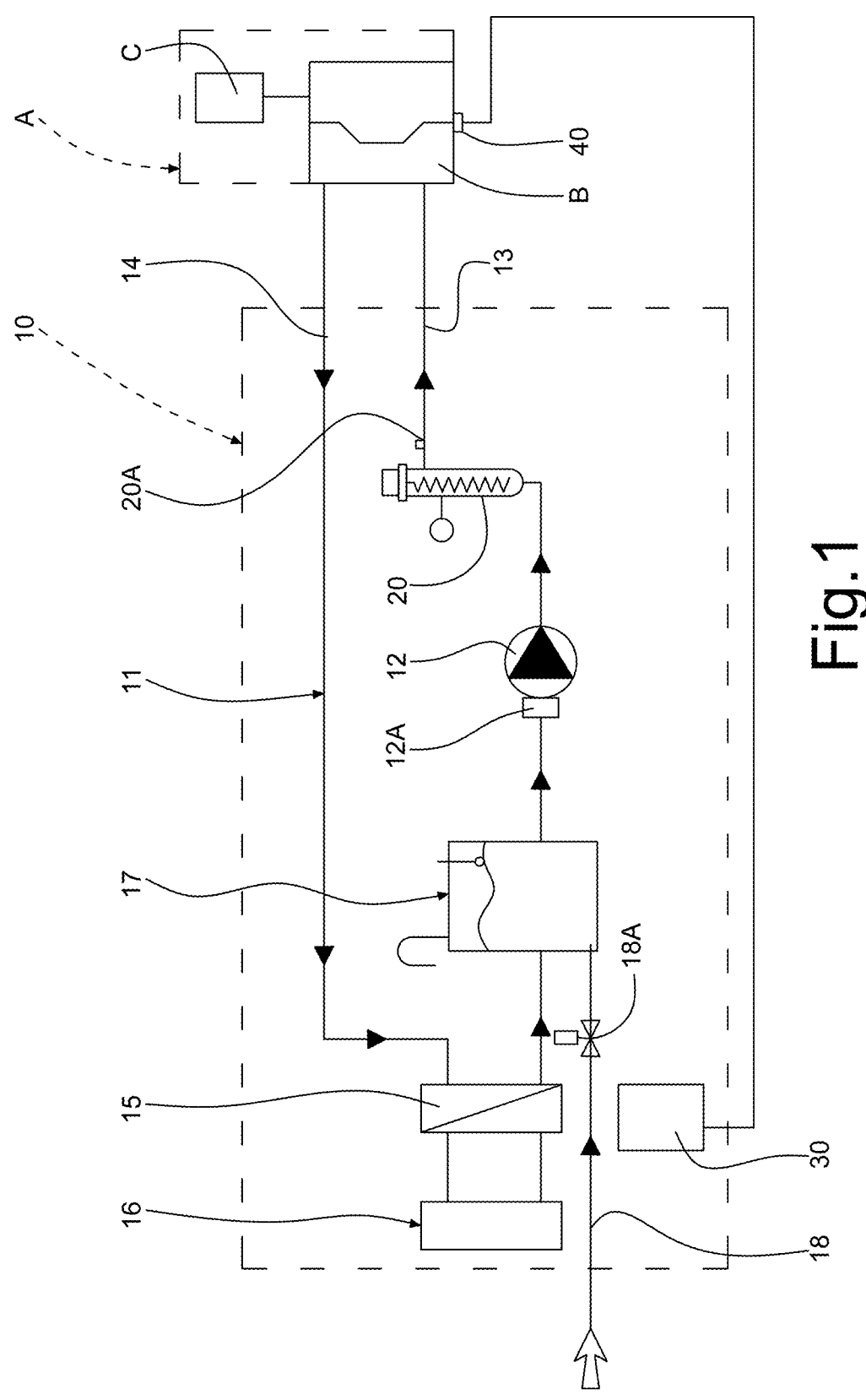
FIG. 1 shows a machine layout according to the invention, associated with a moulding plant.

With reference to the aforementioned figures, a first embodiment of a machine for the temperature control of a forming mould according to the invention is indicated as a whole by the reference number 10.

Said machine 10 is inserted in a moulding manufacturing plant, indicated as a whole by the reference letter A, for example a moulding plant, for example of the type involving the injection of plastic material into a forming mould. Said plant A comprises a forming mould, indicated by the letter B, and an injection press, indicated by the letter C.

The machine 10 comprises a hydraulic circuit 11 adapted to thermoregulate, in this case cool, the forming mould B by means of a thermoregulating liquid (i.e. a coolant liquid), such as preferably water (other liquids may be oil and water with glycol, for example). The hydraulic circuit 11 is therefore operationally connected to the forming mould B in order to circulate the thermoregulating liquid therein.

More particularly, the hydraulic circuit 11 comprises a pump 12 for circulating the thermoregulating liquid, of a variable flow rate type, better described below.

Downstream of the pump 12, there is a first section 13 for delivery of the thermoregulating liquid from the hydraulic circuit to the forming mould B.

The hydraulic circuit 11 conveniently comprises a second section 14 for the return of the thermoregulating liquid from the forming mould to the hydraulic circuit.

The hydraulic circuit 11 also comprises a heat exchange unit 15 for the thermoregulating liquid, placed between the return section 14 and the pump 12, in which the thermoregulating liquid is thermally conditioned in order to, in this example, release the heat acquired in the mould while it cools, so as to be able to return to an appropriate temperature for cooling the mould during a subsequent moulding cycle.

In this example, the heat exchange unit 15 has a first interface side associated with the passage of the thermoregulating liquid and a second interface side adapted to receive the heat emitted by the thermoregulating liquid, and wherein said second interface side is operationally connected to a thermal conditioning apparatus 16 adapted to provide the heat exchange unit 15 with a thermal conditioning fluid adapted to exchange heat with the thermoregulating liquid. For example, said thermal conditioning apparatus, together with the heat exchange unit, form a refrigeration system. For example, said refrigeration system 15-16 comprises a compressor, a condenser, an evaporator and an expander, and specifically, the heat exchange unit 15 corresponds to the evaporator, making it possible to cool the liquid coming from the mould.

In other embodiments, as mentioned above, the thermal conditioning apparatus 16 may be a system distinct from the heat exchange unit 15 (e.g. still formed by a refrigeration system comprising for example a compressor, a condenser, an evaporator and an expander), adapted to provide the heat exchange unit 15 with a thermal conditioning fluid adapted to exchange heat with the thermoregulating liquid; in this case the thermal conditioning apparatus 16 and the heat exchange unit are distinct and connected only by pipes for the passage of the thermal conditioning fluid.

The hydraulic circuit 11 also comprises a tank 17 for the thermoregulating liquid, interposed between the pump 12 and the heat exchange unit 15. In this example, said tank 17 is at ambient pressure. In other examples it may be closed and held in a given pressure range that does not include ambient pressure. Conveniently, the tank 17 is operationally connected to a branch 18 for loading thermoregulating liquid coming from a feed network external to the machine and conveniently closed by a loading valve 18A.

Downstream of the heat exchange unit 15 and upstream of the section 13 for delivery of the thermoregulating liquid to the forming mould, there is a device 20 for heating the thermoregulating liquid, which allows the thermoregulating liquid to be heated, if necessary, to the value of the operating temperature, as better explained below. Preferably, said heating device 20 (e.g. of a heating type using the joule effect dude to an electrical resistance or similar) is located between the pump 12 and the delivery section 13. For example, the heating device 20 is associated with a temperature probe 20A that measures the temperature of the thermoregulating liquid leaving the heating device and allows the device to be activated if the measured temperature is inappropriate.

The pump 12, as mentioned, is a variable flow rate type pump. More preferably, the pump is an electric pump of the type with an impeller, and the flow rate variability is obtained by varying the speed of the impeller. To vary the speed of the pump 12 impeller, the pump comprises an inverter 12A, which makes it possible to vary the feed frequency of the pump electric motor, thereby varying the impeller speed. The use of a pump with a variable-speed impeller gives great control over the thermoregulating liquid flow rate variation, thereby obtaining better results in terms of heat exchange at the most appropriate moments of the moulding cycle.

Conveniently, the machine 10 also comprises an electronic control and management apparatus 30, for example a PLC, operationally connected to the various components of the machine (pump 12, heating device 20, heat exchange unit 15, etc.).

In said electronic device 30 there is set at least one value for the operating temperature Te of the thermoregulating liquid and at least one predetermined time-based pump 12 flow rate variation profile P1, so that upon receipt of a synchronization signal at a predetermined moment of the moulding process in mould B, the pump 12 moves the thermoregulating liquid with a variable flow rate based on the predetermined time-based flow variation profile. Since the variability of the pump flow rate is created by the variation of the impeller speed, i.e. the feed frequency of the pump electric motor, the predetermined time-based pump flow rate variation profile corresponds to a predetermined time-based impeller speed variation profile, i.e. a predetermined feed frequency variation profile of the pump electric motor by means of the inverter.

For example, the synchronization signal at a predetermined moment of the moulding process in mould B may be a signal coming from a sensor 40 that detects the closure/opening of the mould B, operationally connected to the electronic device 30, so that the electronic device commands the machine to match, or synchronize, the start of the time-based pump flow rate variation profile P1 with the closure of the mould, i.e. with the start of the forming phase.

By knowing the temperature of the forming material in the mould B over time, in other words the temperature of the mould if it were not conditioned by the thermoregulating liquid, it is possible to program a suitable variation of the quantity of liquid circulating in the mould, thereby obtaining thermoregulation of the mould in the preferred manner, by providing the preferred quantity of liquid at the right moment in order to achieve the desired mould temperature profile over time.

It should be noted that the sensor 40, such as a micro-switch for example, may be applied to the mould B and be part of the machine 10.

It should be noted that the control operation does not envisage retro-control of the mould temperature but simply the delivery, at the necessary moments, of given quantities of thermoregulating liquid determined earlier, prior to the start of the process, in other words programmed. In practice, the electronic device 30 is provided with a "recipe", i.e. settings for a series of predetermined operating parameters based on the specific moulding process.

In practice, given a moulding process forming cycle, which involves closure of the mould, the forming phase and subsequent opening of the mould, the machine enables a flow of thermoregulating liquid to be introduced into the mould, the flow rate of which varies in a predetermined manner over the time of the forming cycle, and where this variation is synchronized with the forming cycle based, for example, on a mould closure signal coming from a sensor.

Figure 2:
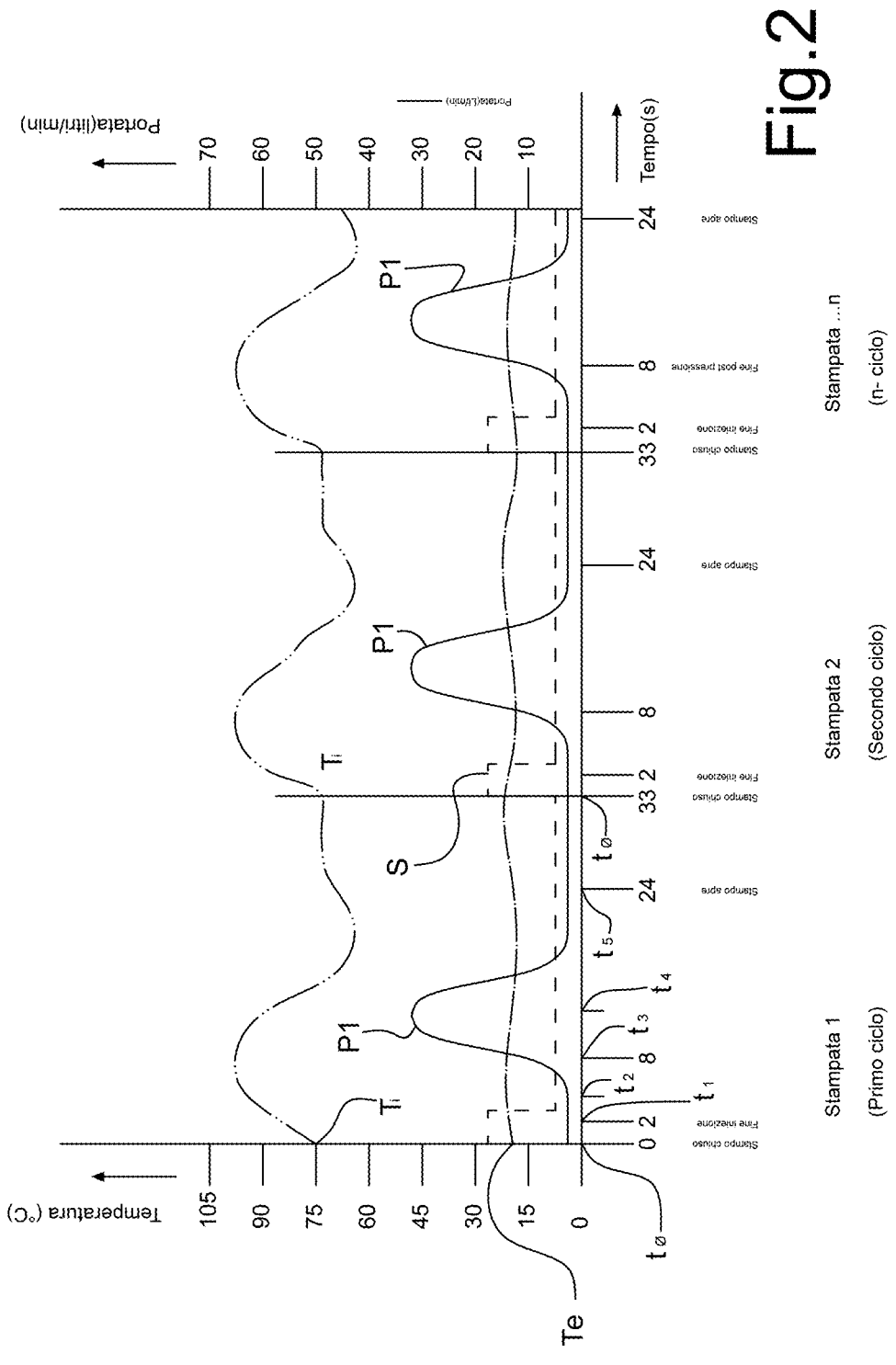
FIG. 2 shows a graph illustrating several moulding cycles of the plant shown in FIG. 1, where time is indicated on the X-axis, while the mould temperature, the temperature of the thermoregulating liquid, and the flow rate of the thermoregulating liquid are shown on the Y-axis.

FIG. 2 shows a graph representing an example of a moulding process involving the injection of plastic material into the forming mould B.

In this example, the injection press cycle lasts 33 seconds, i.e. every 33 seconds the mould is closed, the plastic material is injected under pressure, the mould is kept under pressure for a certain interval, then the mould is opened, there is a waiting time during which the piece is extracted, then the mould is reclosed and the cycle begins again.

The hydraulic circuit 11 of the machine 10 is connected to the cooling ducts of the mould B by means of the delivery section 13 and the return section 14.

The thermoregulating liquid sent to the mould, in this case for cooling, is at an almost constant operating temperature Te, for example 23° C., with a variability interval for this value less than ±3° C. and more preferably less than ±1° C.

Said temperature of the coolant water sent to the mould is indicated in FIG. 2 by a dash-dotted line.

The operating temperature is guaranteed, for example, by the heating device (and, in the event that this device is not present, by the heat exchange unit 15). For example, the temperature probe 20A measures the temperature of the coolant water leaving the heating device and if it is lower than the set temperature Te, the device 20 heats the water until it reaches the temperature Te.

Returning to the moulding cycle, at time to there is the closure of the mould and the start of plastic material injection until time t1 (in the example shown in the graph, 2 seconds after closure of the mould). The mould closure/opening signal is represented on the graph by the dashed line S.

As mentioned, the electronic device 30 is loaded with a predetermined time-based flow rate variation profile P1 for the pump 12, synchronized with the closure of the mould. At the instant t0, i.e. upon receipt of the mould closure signal (or after a certain delay if thus programmed), the electronic device 30 communicates with the inverter 12A to maintain the pump motor feed frequency, i.e. the rotation speed of the pump impeller, according to a pre-set profile. For example, for the first seconds the pump speed, i.e. the coolant water flow rate, remains constant at the value V0 (equivalent to around 15% of the maximum speed of the pump impeller) and then, from instant t2, increases considerably up to a peak value V1 (reached at instant t4) equivalent to 95% of the maximum speed of the pump impeller (in the graph, the coolant water flow rate in litres per minute is indicated by a continuous line). Subsequently, the speed (i.e. flow rate) of the pump decreases rapidly once again to the initial flow rate/speed V0, and remains constant until the end of the cycle (note that the variation of the pump motor feed frequency may be stepped, i.e. passing from one frequency to the next without passing through intermediate frequencies-obviously the variation in the flow rate, on the other hand, will be continuous and not stepped).

The graph illustrated in FIG. 2 also shows the variation in the temperature of the mould (measured at a sample point) during the process cycle, and it is indicated by a dash-dot-dot line. As can be seen, the temperature of the mould increases from the closure of the mould (e.g. from a value Ti of 75° C. until just after the end of the plastic material injection phase (t1), before then decreasing until just after the post-pressure end phase t3. Upon opening of the mould, at instant t5, the mould temperature starts to increase again until it reaches the initial temperature Ti of 75° C.

Figure 3:
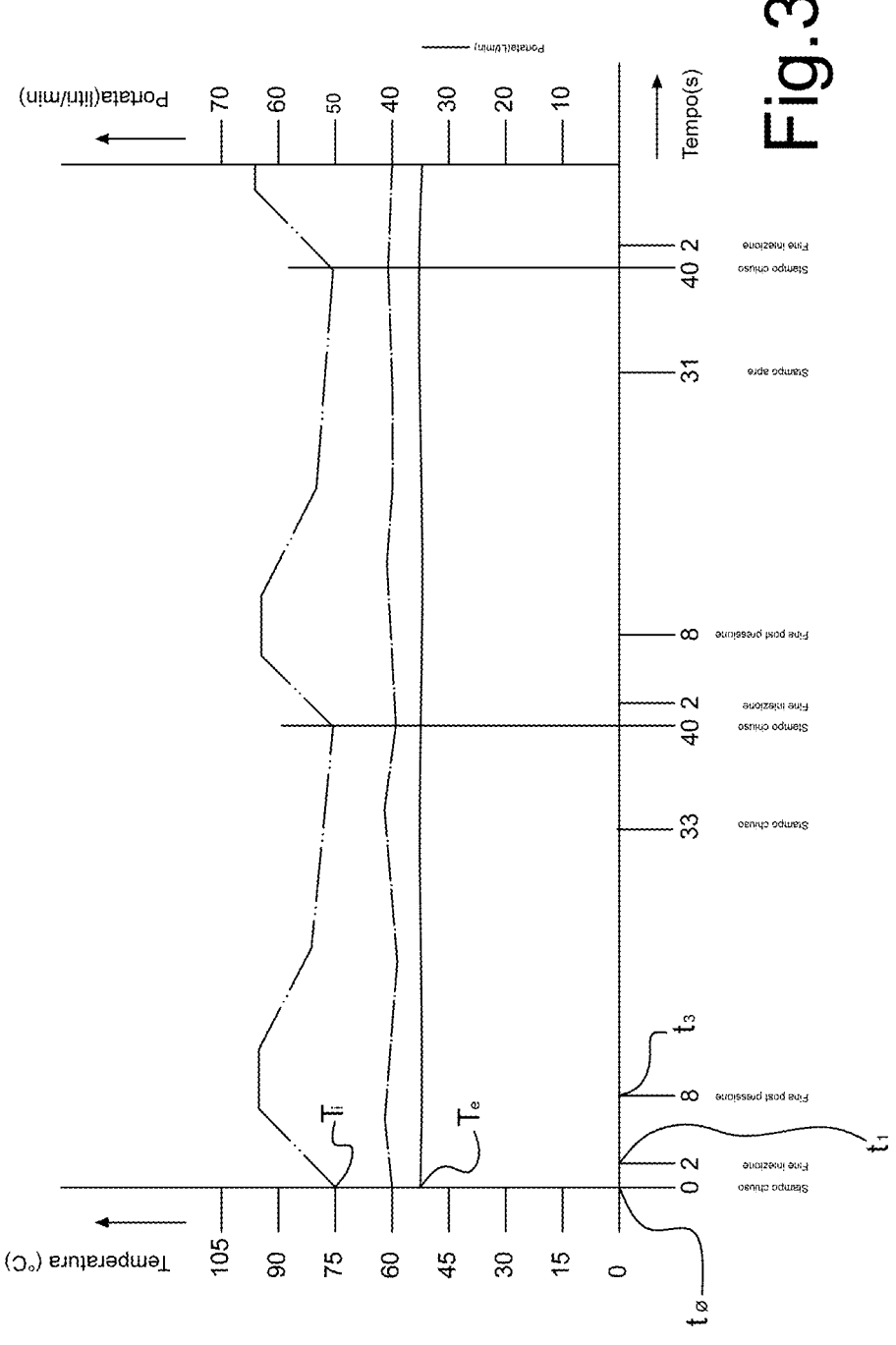
FIG. 3 shows a graph illustrating several moulding cycles of a moulding plant such as that shown in FIG. 1, but with a machine for the thermoregulation of the mould according to prior art.

FIG. 3 shows the graph relating to moulding of the same piece (using the same mould) moulded in the example given in the graph in FIG. 2, but using the traditional technique of cooling the mould by sending coolant water through the mould cooling ducts. Obviously the starting temperature Ti (the arrival of the mould in the moulding cycle) is the same in the two examples. As can be easily seen in the second example shown in FIG. 3, the coolant water flow rate is constant throughout the cycle and has a much higher operating temperature Te than the previous example (constant at around 60° C.), with a longer cycle length (around 40 seconds).

Returning to the machine according to the invention, in the case where the moulding process is interrupted for some reason (for example an injection press stoppage), the electronic control and management device 30 changes the machine's management parameters.

If for a time greater than the threshold value Dtx, e.g. 15 minutes, no signal arrives from the process—which for the example seen above means a mould closure signal does not arrive—at the instant tx (i.e. t0+Dtx) the electronic device 30 activates standby mode, which keeps the mould in pre-heating.

Figure 4:
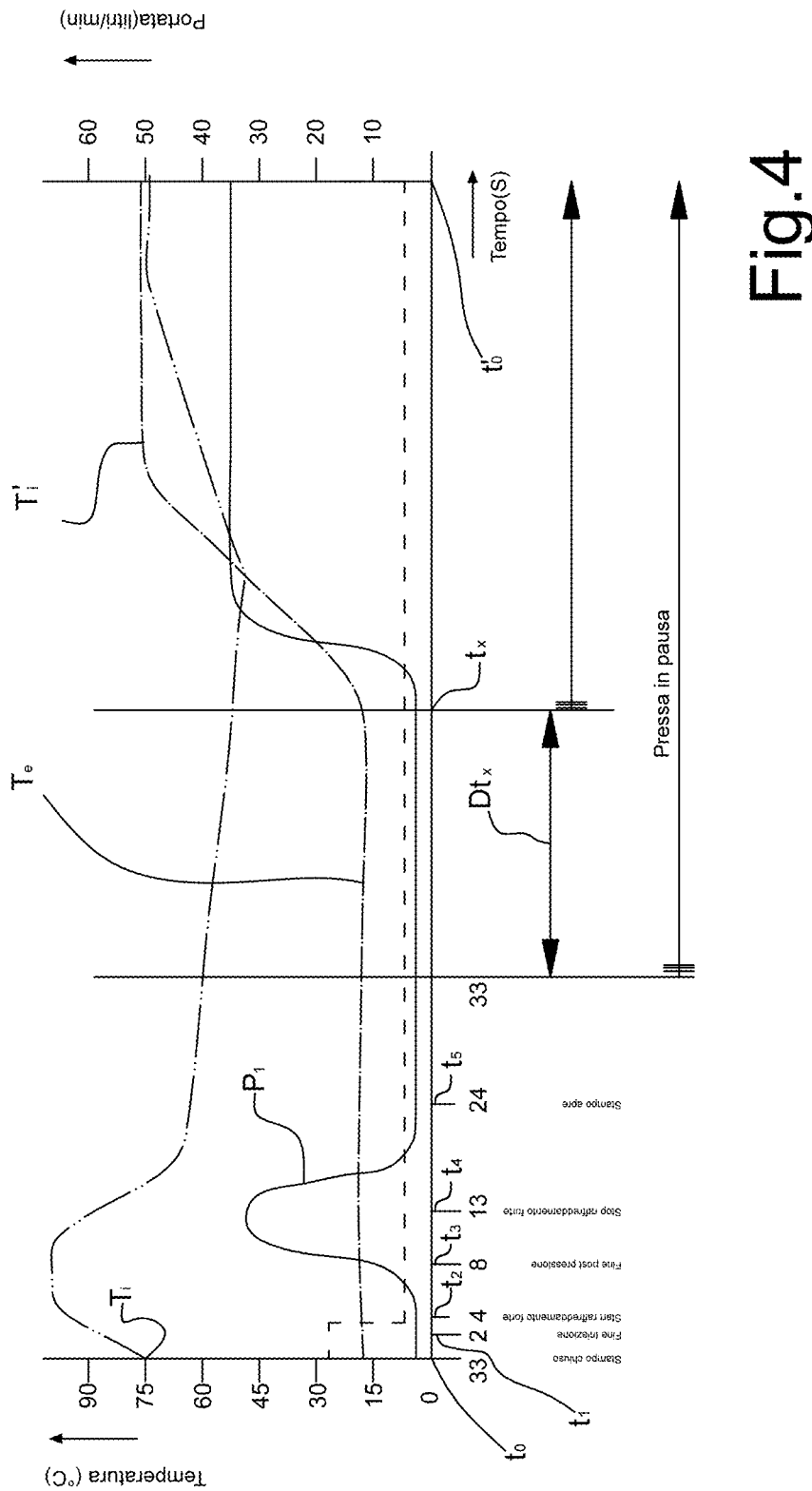
FIG. 4 shows a graph similar to that shown in FIG. 2, but illustrating a phase of waiting without moulding in the plant shown in FIG. 1.

In this regard, see the example graph shown in FIG. 4.

If, after the cycle end time (in the case described, 33 seconds from time t0), for a time interval Dtx there is no signal from the process (for example a mould closure signal in order to start a new cycle), the electronic device 30 commands the heating device 20 to heat the thermoregulating liquid to a pre-heating temperature Ti', for example the mould closure temperature Ti, namely 75° C. The pump flow rate, or rather the speed of its impeller, is modified so that the speed is increased to a high value, for example the maximum possible speed value Vm (in any case a value greater than the value V1 which it assumes during the cycle for maximum cooling), for example 100% of the possible speed (i.e. the maximum possible flow rate that can be reached). In this way the mould heats gradually while awaiting a new mould closure signal, so as to be able to re-start the moulding cycle as described previously.

Figure 5:
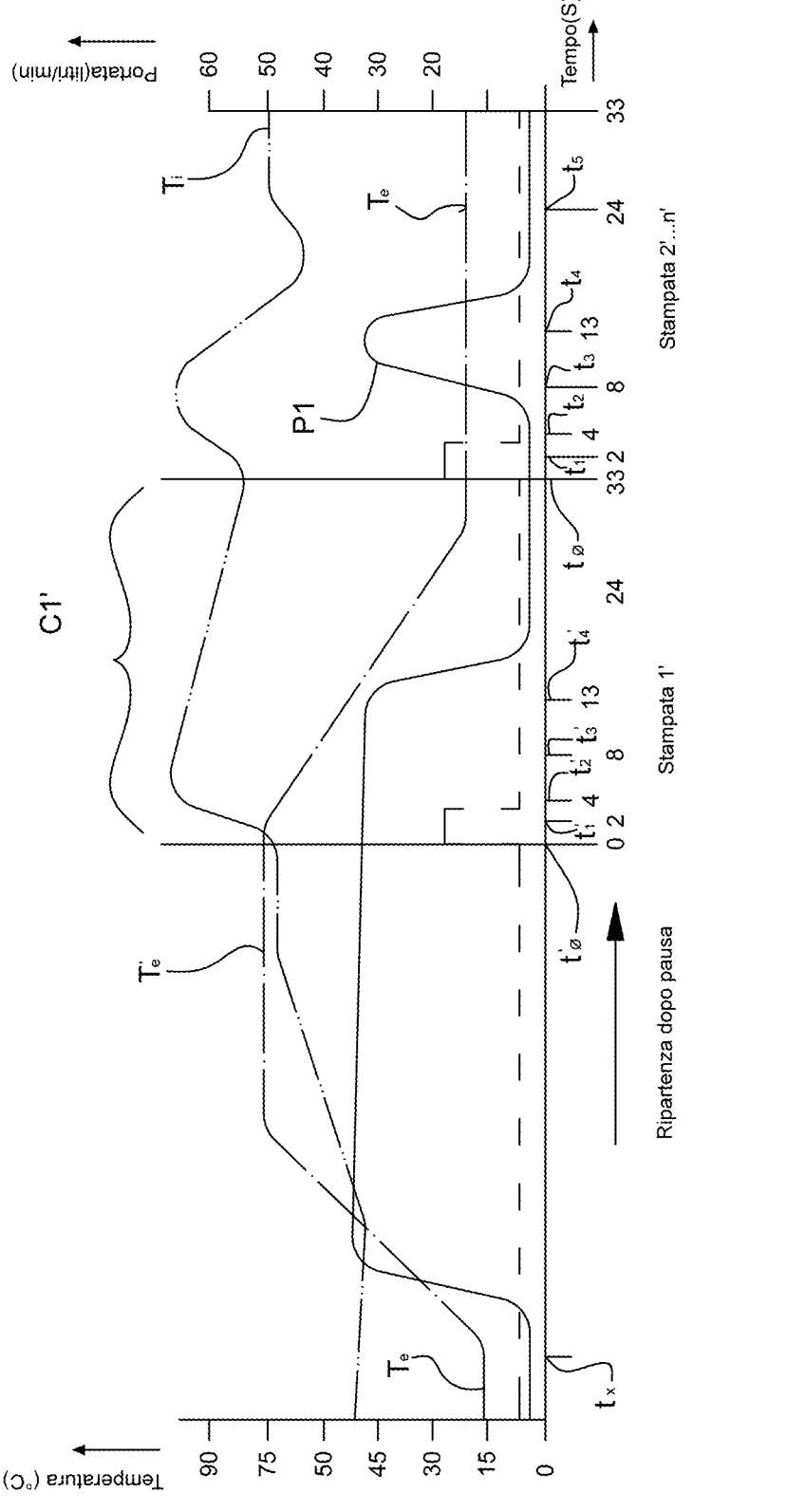
FIG. 5 shows a graph similar to that shown in FIG. 2, but also illustrating a new moulding cycle start phase after a phase of waiting without moulding in the plant as described in FIG. 4.

Upon receipt of a new signal from the process (see the graph in FIG. 5), at the instant t0', the electronic device 30 once again modifies the process parameters, returning to production mode. Therefore, the temperature of the coolant water is brought from the pre-heating temperature Ti' to the operating temperature Te for cycle start (in the previous example 23° C.).

The first cycle C1 after the waiting/pre-heating period is "anomalous" since the actual temperature of the coolant water needs time to reach the new temperature Te.

The speed of the pump 12 obviously changes as a function of the synchronization with the process, i.e. according to the pre-set times, and at the instant t4' of the cycle C1', switches from "hard" cooling with speed V1 to "soft" cooling with speed V0 as defined above. Starting from the second moulding cycle after the stoppage, the temperatures are already approaching the operating temperature. The return to full capacity process performance is obtained after 4-5 moulding cycles, depending on various factors, such as: mould dimensions, power of the heating device and of the heat exchange unit, various thermal dispersions, etc.

In the example described, the machine 10 is substantially autonomous and substantially provides, as connections external to the machine, the hydraulic connections to the mould, application of the microswitch 40 to the mould, the loading branch 18 to the tank 18 and the machine's electric wiring to the external system as well as any electronic cables from the electronic device to other parts of the plant.

In particular, the heat exchange unit 15 and the thermal conditioning apparatus 16 form an integrated system inside the machine.

Figure 6:
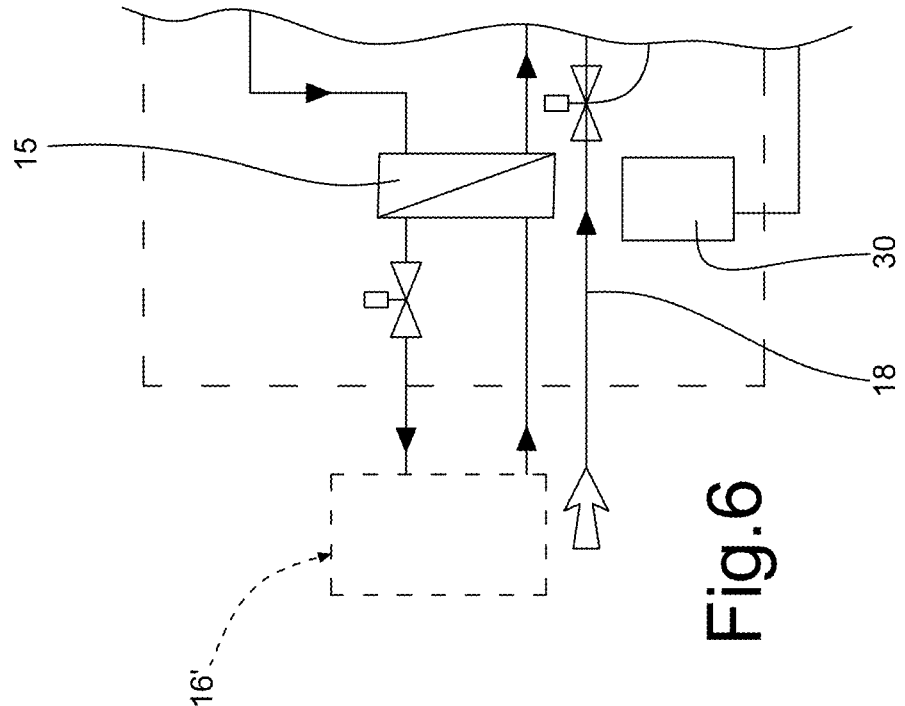
FIG. 6 shows a machine layout according to the invention, with a variant part with respect to the case shown in FIG. 1.

In other embodiments, as illustrated schematically in FIG. 6, the thermal conditioning apparatus 16' may be external to the machine 10 and may, for example, be part of a conditioning system in the plant where the machine works and which may service several users.

Figure 7:
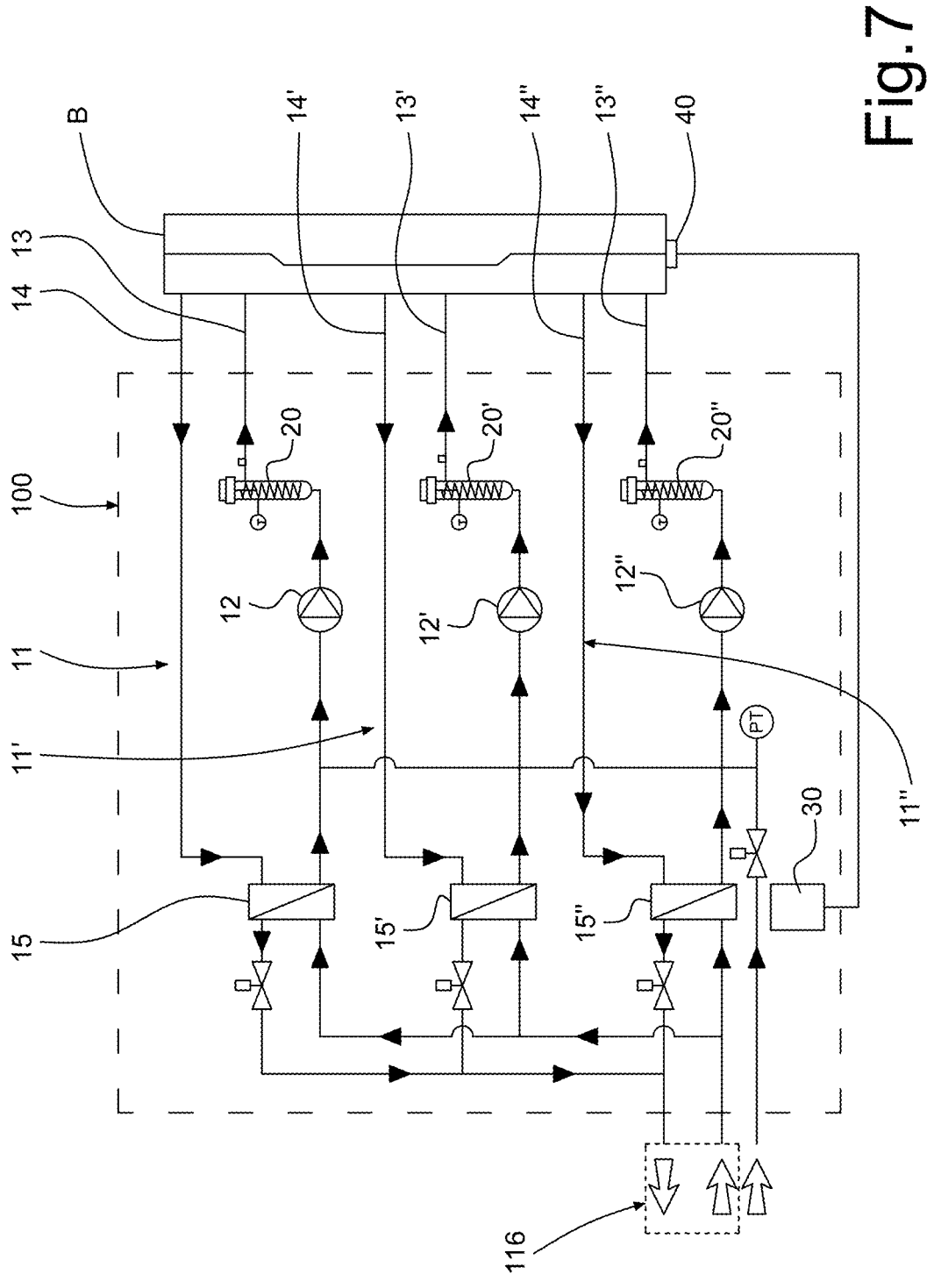
FIG. 7 shows a machine layout according to the invention, with a variant with respect to the case shown in FIG. 1 and FIG. 6.

In the example just described, the case has been shown of a machine with a single hydraulic circuit connected to the mould, so that the thermoregulating liquid enters the mould at a given temperature, and leaves it at a different temperature, providing the mould with a single heat exchange process (heat exchange from the mould to a single flow of thermoregulating liquid at a given temperature). In other embodiments, such as for example the case of the machine 100 shown in FIG. 7, in order to differentiate the heat exchange options in different parts of the mould, the machine features several hydraulic circuits 11-11'-11" placed in parallel between one another, each with their own delivery sections 13-13'-13" and return sections 14-14'14", and their own pumps with inverters 12-12'-12", heating devices 20-20'-20" and heat exchange units 15-15'-15", each operationally connected to an electronic management and control device 20. The inlet and outlet sections of the second interface sides of the heat exchange units 15-15'-15" are connected to one another in parallel and are operationally connected to an inlet and an outlet of the thermal conditioning fluid by a thermal conditioning apparatus 116 external to the machine 100 (but in other examples, said thermal conditioning apparatus may be internal, as in the case shown in the example in FIG. 1). Machine operation is substantially similar to the case described previously, and each thermoregulating liquid will have its own temperature and flow rate profile, the use of which will nevertheless be synchronized with the others.

It is understood that what has been illustrated represents only possible non-limiting embodiments of the invention, which may vary in forms and arrangements without departing from the scope of the concept underlying the invention. The presence of reference numbers in the attached claims has the sole purpose of facilitating their reading, in the light of the preceding description and of the accompanying drawings, and in no way limits the scope of protection.

The invention claimed is:

1. A machine for the temperature control of part of an industrial plant comprising a forming mold for the formation of a product, said machine comprising:

at least one thermoregulating hydraulic circuit adapted to be operationally connected with said part of an industrial plant adapted for the formation of a product, wherein a thermoregulating liquid circulates in said hydraulic circuit; said hydraulic circuit comprising a recirculating pump for the thermoregulating liquid, of the variable flow type, downstream of the pump, a section for delivery of the thermoregulating liquid from the hydraulic circuit to the product formation part of an industrial plant, a section for returning the thermoregulating liquid from the product formation part of an industrial plant to the hydraulic circuit, and a heat exchange unit for the thermoregulating liquid, wherein the thermoregulating liquid is thermoregulated, an electronic control and management apparatus, in which there is set at least one value for the operating temperature of the thermoregulating liquid and at least one predetermined time-based pump flow rate variation profile, according to which, upon receipt of a synchronization signal at a predetermined moment of the industrial process of product formation in the part of the plant to be thermoregulated, the pump moves the thermoregulating liquid with a variable flow based on said predetermined flow variation profile over time, wherein said machine is adapted to work in cyclical ways, and wherein said electronic control and management apparatus is configured to receive a signal from the formation part of the industrial plant to be thermoregulated, synchronize a flow rate variation profile for said pump with said signal, so that from a given moment during the machine operating cycle, the pump flow rate varies in a predefined manner, wherein said machine is adapted to cool said forming mold, and wherein the machine is adapted to receive a closure signal for the mold from the formation part of the industrial plant equipped with the forming mold to be thermoregulated, the thermoregulating liquid is sent by the pump to the mold at a constant operating temperature during the molding phase, there being envisaged a phase of regulating the temperature of the liquid before sending it to the mold, in the case of a temperature value lower than the operating temperature, in a molding cycle involving closing-opening-closing of the mold, the flow rate variation profile for the thermoregulating liquid entering the mold is synchronized with the molding cycle based on said mold closure signal and provides for a low initial flow rate value, for gentle cooling of the mold, and a subsequent high flow rate value, greater than said initial value, for a more intense cooling of the mold.

2. The machine according to claim 1, wherein said pump comprises a variable-speed pump impeller, so that varying the speed of the impeller also varies the flow rate of the pump; said predetermined time-based pump flow rate variation profile corresponding to a predetermined time-based impeller speed variation profile.

3. The machine according to claim 2, wherein said pump comprises an inverter adapted to manage the rotation speed of the pump impeller, so that said predetermined time-based pump flow rate variation profile corresponds to a predetermined profile for pump feed frequency variation by means of said inverter.

4. The machine according to claim 1, wherein downstream of said heat exchange unit and upstream of said section for delivery to the product formation part of an industrial plant, there is a thermoregulating liquid heating device adapted to heat said thermoregulating liquid, if necessary, to said operating temperature in the case where the input temperature to said heating device is lower.

5. The machine according to claim 1, wherein said hydraulic circuit comprises a tank for the thermoregulating liquid, interposed between said pump and said heat exchange unit, said tank being at ambient pressure or closed and held in a pressure range that does not include ambient pressure.

6. The machine according to claim 1, comprising a thermal conditioning apparatus adapted to provide said heat exchange unit with a thermal conditioning fluid adapted to exchange heat with said thermoregulating liquid.

7. The machine according to claim 1, wherein said heat exchange unit has inlet and outlet pipes for feeding a thermal conditioning fluid, and is configured to be operationally connected to a thermal conditioning system external to the machine.

8. The machine according to claim 1, wherein said heat exchange unit for the thermoregulating liquid is placed between said return section and said pump.

9. The machine according to claim 1, wherein said section for delivery and said section for returning the thermoregulating liquid are adapted to be operationally connected to a pipe inside a forming mold so as to send the thermoregulating liquid into the forming mold to thermoregulate it and to allow the return of the liquid to be reconditioned.

10. The machine according to claim 1, wherein said part of the plant comprises a forming mold to be conditioned, and said machine is adapted to condition the temperature of said mold, said conditioning being cooling or heating or both.

11. The machine according to claim 1, wherein, in the case where for a given interval of time the machine does not receive signals from the formation part of the industrial plant equipped with the forming mold to be thermoregulated, the pump flow rate variation profile is modified to keep the flow rate at a low value for gentle cooling of the mold, the value for the operating temperature of the thermoregulating liquid entering the mold is increased, and subsequent to said interval of time without said signals, upon receipt of a new said signal, the flow rate variation profile for the liquid entering the mold returns to the predetermined profile for a normal molding cycle.

12. The machine according to claim 1, wherein said synchronization signal at a predetermined moment of the industrial process of product formation in the part of the plant to be thermoregulated is one of the following:

a forming mold closure signal, a forming mold opening signal, the signal to start the injection of forming material into the mold, a signal to end the injection of forming material into the mold, the signal to open the purge gasses that the injection presses send into the mold after the injection, any signal coming from the plant relating to a phase of the forming process that always repeats itself at the same moment of a forming cycle, and any signal coming from the plant relating to a phase of the forming process that always repeats itself at the same moment of a forming cycle between the opening and closure of a mold.

13. The machine according to claim 4, wherein; said heating device being is preferably downstream of said pump.

14. The machine according to claim 5, wherein said tank being is operationally connected to a branch for loading thermoregulating liquid coming from a feed network external to the machine.

15. The machine according to claim 6, wherein said thermal conditioning apparatus forms, with said heat exchange unit, a refrigeration system entirely inside the machine, wherein said heat exchange unit forms a condenser or evaporator for the refrigeration system.

16. The machine according to claim 6, wherein said thermal conditioning apparatus is a refrigeration unit distinct from said thermal conditioning unit, adapted to provide said unit with a thermal conditioning liquid for conditioning said thermoregulating liquid by means of a heat exchange.

17. The machine according to claim 11, wherein the value for the operating temperature of the thermoregulating liquid entering the mold is increased to a value corresponding to the temperature value of the mold at the moment the mold is closed.

* * * * *